(12) United States Patent
Nakano et al.

(10) Patent No.: US 10,372,153 B2
(45) Date of Patent: Aug. 6, 2019

(54) LEVER DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Yohei Nakano, Aichi (JP); Etsuo Shimizu, Toyota (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 453 days.

(21) Appl. No.: 15/202,865

(22) Filed: Jul. 6, 2016

(65) Prior Publication Data

US 2017/0017256 A1   Jan. 19, 2017

(30) Foreign Application Priority Data

Jul. 13, 2015 (JP) ................. 2015-139681

(51) Int. Cl.
*G05G 1/04* (2006.01)
*G05G 5/03* (2008.04)
(Continued)

(52) U.S. Cl.
CPC .............. *G05G 9/02* (2013.01); *F16H 59/02* (2013.01); *F16H 61/24* (2013.01); *G05G 1/04* (2013.01);
(Continued)

(58) Field of Classification Search
CPC .. F16H 61/24; F16H 59/02; F16H 2059/0269; G05G 9/00
See application file for complete search history.

(56) References Cited

U.S. PATENT DOCUMENTS

| 4,457,188 A | 7/1984 | Hauser |
| 4,569,245 A | 2/1986 | Feldt et al. |

(Continued)

FOREIGN PATENT DOCUMENTS

| DE | 3341878 | 5/1985 |
| DE | 3742084 | 6/1989 |

(Continued)

OTHER PUBLICATIONS

Extended European Search Report for EP 16 17 8559.7 dated Mar. 13, 2017.

(Continued)

*Primary Examiner* — Terence Boes
(74) *Attorney, Agent, or Firm* — Greenblum & Bernstein, P.L.C.

(57) ABSTRACT

A lever device includes a housing and a lever unit pivotally coupled to the housing. The lever unit includes a lever shaft and a pivot shaft that extends in a direction intersecting the lever shaft. The pivot shaft functions as a pivot axis of the lever unit when the lever is pivoted in a first direction. The housing includes a retainer that accommodates the pivot shaft. The pivot shaft includes first and second guides. The first guide slides on the retainer when the lever unit is pivoted in the first direction to permit movement of the lever unit. The second guide that slides on the retainer when the lever unit is operated in a second direction to permit movement of the lever unit.

7 Claims, 7 Drawing Sheets

(51) Int. Cl.
  *G05G 9/02* (2006.01)
  *F16H 59/02* (2006.01)
  *F16H 61/24* (2006.01)

(52) U.S. Cl.
  CPC ......... *G05G 5/03* (2013.01); *F16H 2059/026* (2013.01); *F16H 2059/0269* (2013.01)

(56) References Cited

U.S. PATENT DOCUMENTS

| | | | |
|---|---|---|---|
| 5,247,848 A | 9/1993 | Sabel | |
| 5,802,922 A | 9/1998 | Kawai et al. | |
| 6,029,537 A | 2/2000 | Nagao | |
| 2002/0056334 A1* | 5/2002 | Fujinuma | F16H 59/0204 74/473.1 |
| 2005/0139031 A1* | 6/2005 | Giefer | F16H 59/0204 74/473.15 |
| 2007/0034041 A1* | 2/2007 | Dominguis Botella | F16H 59/044 74/523 |
| 2008/0163714 A1* | 7/2008 | Wang | F16H 61/24 74/473.23 |
| 2011/0296943 A1* | 12/2011 | Peukert | F16H 59/02 74/473.12 |
| 2013/0125692 A1* | 5/2013 | Sasaki | F16H 59/02 74/473.36 |
| 2016/0123460 A1 | 5/2016 | Tsukazaki et al. | |
| 2018/0094720 A1* | 4/2018 | Colom | F16H 59/04 |

FOREIGN PATENT DOCUMENTS

| | | |
|---|---|---|
| EP | 0529251 | 3/1993 |
| JP | 63-147922 | 9/1988 |
| JP | 2002-254944 | 9/2002 |
| JP | 2009-101914 | 5/2009 |
| JP | 4563832 | 10/2010 |
| JP | 2015-7937 | 1/2015 |
| JP | 2015-009747 | 1/2015 |
| JP | 2015-221603 | 12/2015 |

OTHER PUBLICATIONS

Partial European Search Report for EP 16178559.7 dated Nov. 29, 2016.
Chinese Office Action for CN App. No. 201610536619.3 dated Apr. 2, 2018, along with English-language translation thereof.
Japanese Office Action for JP App. No. 2015-139681 dated Apr. 25, 2017, along with English-language translation thereof.
Official Action in Indian Patent Application No. 201624023711 dated Mar. 29, 2019.

* cited by examiner

LEVER DEVICE

CROSS-REFERENCE TO RELATED APPLICATIONS

This application is based upon and claims the benefit of priority from prior Japanese Patent Application No. 2015-139681, filed on Jul. 13, 2015, the entire contents of which are incorporated herein by reference.

FIELD

This disclosure relates to a lever device including a lever that is movable in at least two intersecting directions.

BACKGROUND

Japanese Patent No. 4563832 describes a lever device used to switch shift positions of a lever in a vehicle. Such a lever device is often applied to a shift-by-wire lever device that sends electrical signals corresponding to the shift position of the lever to a transmission in order to switch actuation modes of the transmission. The operation lever is, for example, movable in two directions, namely, a shift direction, which extends in the front-rear direction of the vehicle body, and a select direction, which extends perpendicular to the shift direction.

The operation lever in the publication is pivotally coupled to a housing of the lever device by two shafts. The operation lever is pivoted about one of the shafts when operated in the shift direction and pivoted about the other shaft when operated in the select direction. In this manner, two shafts are required in the conventional structure to move the operation lever in different directions.

SUMMARY

One embodiment of a lever device includes a housing and a lever unit pivotally coupled to the housing so that the lever unit is pivotal in a plurality of different directions. Further, the lever unit includes a lever shaft and a pivot shaft that extends from two opposite sides of the lever shaft in a direction intersecting the lever shaft. The pivot shaft functions as a pivot axis of the lever unit when the lever unit is pivoted in a first direction. The housing includes a retainer that accommodates the pivot shaft. The pivot shaft includes a first guide and a second guide. The first guide slides on the retainer when the lever unit is pivoted in the first direction to permit movement of the lever unit. The second guide slides on the retainer when the lever unit is operated in a second direction to permit movement of the lever unit.

Other embodiments and advantages of the present invention will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a lever device will now be described with reference to FIGS. 1 to 11.

Figure 1:
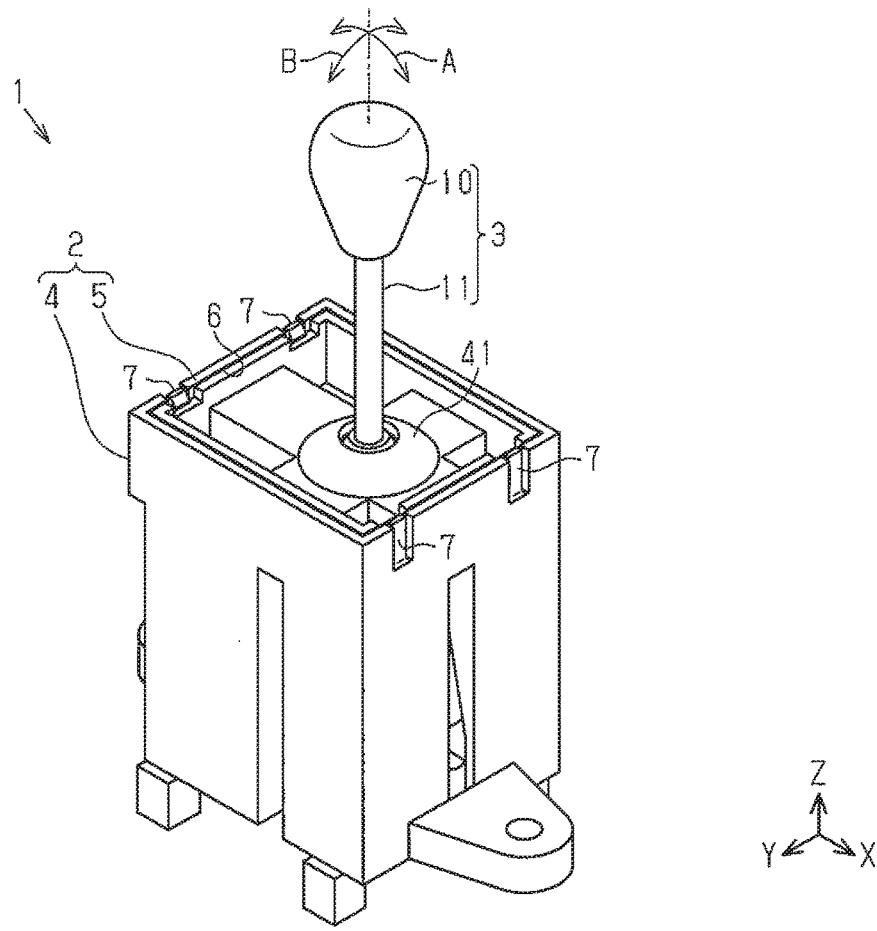
FIG. 1 is a perspective view illustrating one embodiment of a lever device.

As illustrated in FIG. 1, a vehicle includes a lever device 1 used to switch shift positions of a vehicle transmission. The lever device 1 includes a housing 2 and a lever unit 3. The lever unit 3 is pivotally coupled to the housing 2. The lever device 1 is of a shift-by-wire type and sends electrical signals corresponding to the position (shift position) of the lever unit 3 to the transmission in order to switch actuation modes of the transmission. The housing 2 is, for example, generally box-shaped.

The lever unit 3 is movable in a plurality of different directions. In the present example, the lever unit 3 is movable in two directions, namely, a shift direction, which is in a plane that extends in the front-rear direction of the vehicle body (the direction indicated by arrows A in FIG. 1), and a select direction, which is in a plane perpendicular to the shift direction (the direction indicated by arrows B in FIG. 1). The lever unit 3 is moved along a path defined by a given shift pattern. In the present example, the shift pattern includes two parallel lines extending in the shift direction and one line extending in the select direction and connecting the two shift-direction lines. Shift positions include, for example, a home position, a neutral (N) position, a drive (D) position, a reverse (R) position, and a regenerative brake (B) position. The lever device 1 is of a momentary type. Thus, when the lever unit 3 moved from the home position to another position and then released, the lever unit 3 automatically returns to the home position.

Figure 3:
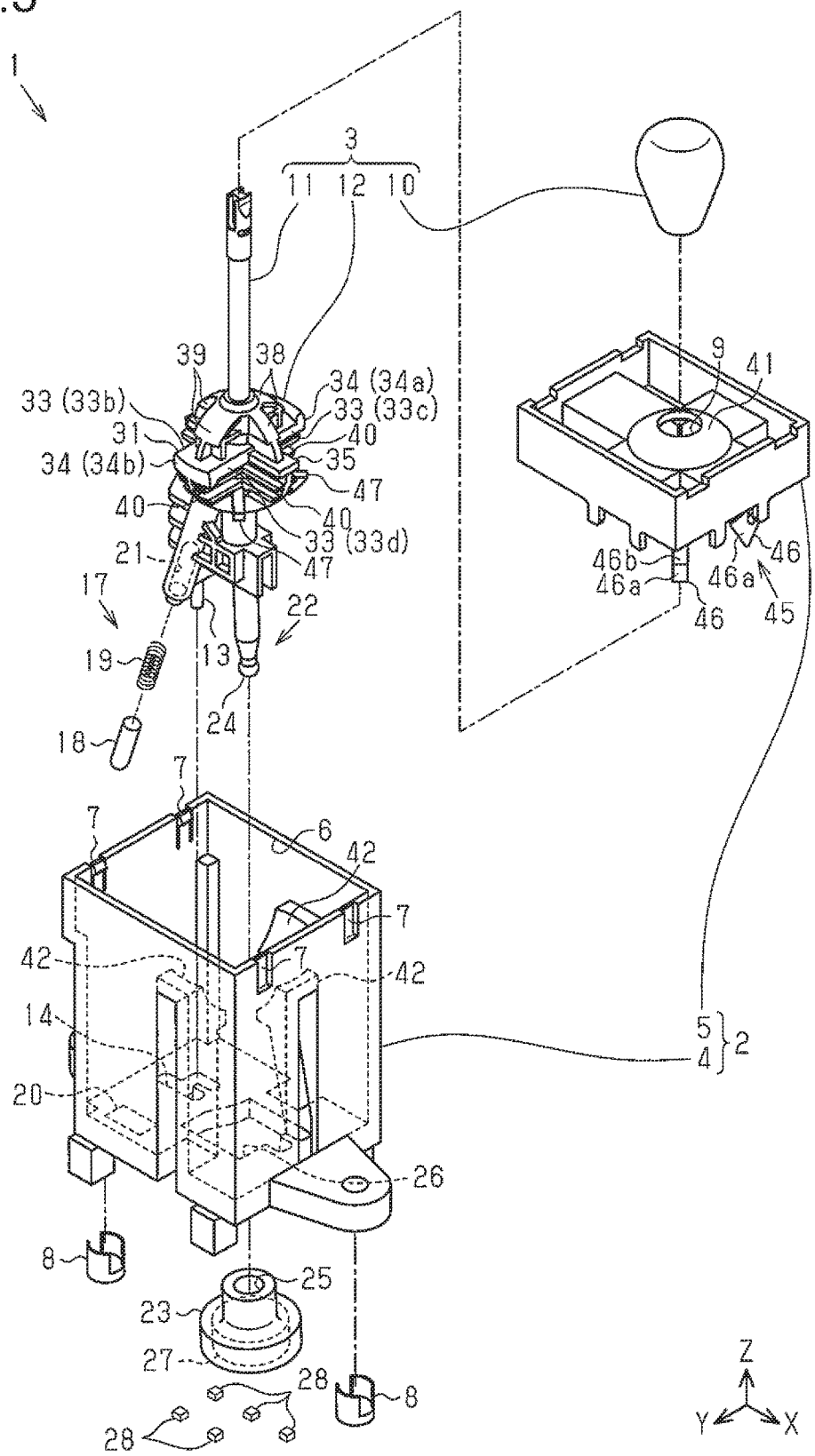
FIG. 3 is an exploded perspective view of the lever device illustrated in FIG. 1.

As illustrated in FIG. 3, the housing 2 includes a housing main body 4, which includes a bottom end closed by a wall, and a cover 5, which closes an open upper end 6 of the housing main body 4. The housing main body 4 includes, for example, snaps 7 to fix the cover 5 to the housing main body 4. The housing main body 4 is fixed to the vehicle body by bolts (not illustrated) inserted through collars 8. This couples the lever device 1 to the vehicle body. A lever hole 9 extends through the cover 5 at a location slightly separated from the middle of the cover 5. The lever unit 3 extends through the lever hole 9.

The lever unit 3 includes a lever shaft 11 and a lever shaft support 12. A knob 10 is coupled to the distal end of the lever shaft 11, and the lever shaft support 12 supports the basal end of the lever shaft 11. The lever shaft 11 is, for example, pole-like. The distal portion of the lever shaft 11 and the knob 10 are located outside the housing 2. The lever shaft support 12 is arranged coaxially with the lever shaft 11 and accommodated in the housing 2.

The lower portion of the lever shaft support 12 includes a guide pin 13 that guides the movement of the lever unit 3. The guide pin 13 projects downwardly from the lever shaft support 12. The guide pin 13 is fitted into a guide groove 14 in the bottom wall of the housing 2. The guide groove 14 is shaped in correspondence with the shift pattern (shape of lower-case "h" in present example) of the lever unit 3. The guide groove 14 guides the guide pin 13 when the lever unit 3 is operated and moved to the home position, the N position, the D position, the R position and the B position.

A clicking mechanism 17 is located between the housing 2 and the lever shaft support 12 to cause the lever unit 3 to click when the lever unit 3 is operated. The clicking mechanism 17 includes a clicking piece 18, an urging member 19, and a clicking elevation 20. The clicking piece 18 has a round distal end. The urging member 19 urges the clicking piece 18 against the clicking elevation 20. A lower wall extending from the lever shaft support 12 includes a coupling hole 21. The clicking piece 18 is fitted into the coupling hole 21 with the urging member 19 arranged on the basal portion of the clicking piece 18. The clicking elevation 20 is formed on the bottom wall of the housing 2. When the lever unit 3 is moved, the clicking mechanism 17 causes the lever unit 3 to click as the clicking piece 18 moves over the clicking elevation 20.

A ball joint 22 located at the lower portion of the lever shaft support 12 is coupled to a magnetic component 23. A magnet coupling ball 24 defined by the distal end of the ball joint 22 is fitted into a socket 25 of the magnetic component 23. In the present example, the ball joint 22 is inserted through an opening 26 that extends through the bottom wall of the housing main body 4. The magnet coupling ball 24, which is located outside the housing 2, is coupled to the magnetic component 23. When the lever unit 3 is pivoted, the ball joint 22 converts the pivoting movement to planar movement of the magnetic component 23. The lever device 1 includes magnetic sensors 28, such as magnetoresistive elements (MRE) sensors, to detect where a magnet 27 of the magnetic component 23 is located. The position (shift position) of the lever unit 3 is detected from the outputs of the sensors 28.

Figure 2:
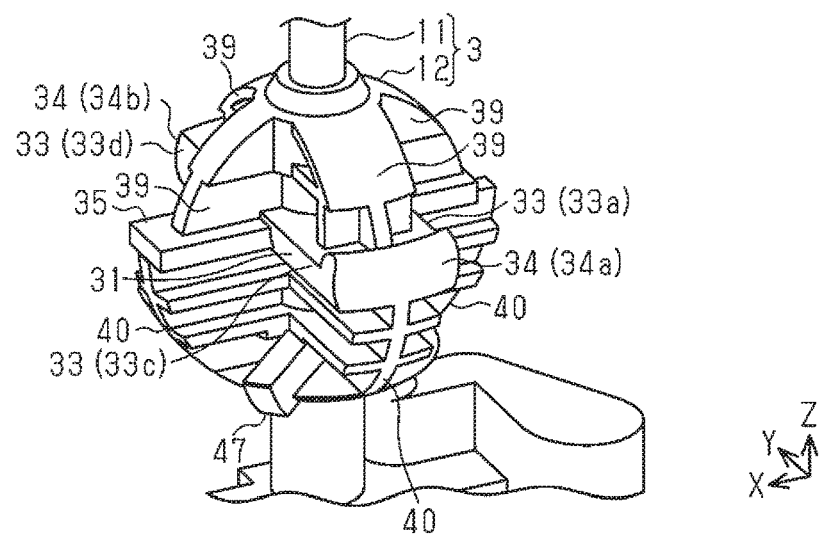
FIG. 2 is a perspective view illustrating a pivot shaft of a lever unit.

As illustrated in FIGS. 2 and 3, the lever unit 3 includes a pivot shaft 31 that extends from two opposite sides of the lever shaft 11 in a direction intersecting the lever shaft 11 (Y-axis direction in FIGS. 2 and 3). The pivot shaft 31 functions as a pivot axis of the lever unit 3 when the lever unit 3 is moved and pivoted in the first direction (shift direction in present example). The pivot shaft 31 is accommodated in a retainer 36 (refer to FIGS. 4 and 5) that is located in the housing 2 (cover 5 in present example). The pivot shaft 31 includes a first guide 33 and a second guide 34. When the lever unit 3 is pivoted in the first direction (shift direction in present example), the first guide 33 slides on the retainer 36 and permits movement of the lever unit 3 in the first direction. When the lever unit 3 is pivoted in the second direction (select direction in present example), the second guide 34 slides on the retainer 36 and permits movement of the lever unit 3 in the second direction.

The first guide 33 is defined by curved surfaces. In the present example, the pivot shaft 31 has the form of a generally flat plate. The first guide 33 includes four guide walls 33a to 33d, each defined by a curved surface. The guide walls 33a and 33c, which extend at one side of the lever shaft 11, are opposing walls defined by concentric arcuate surfaces. The guide walls 33b and 33d, which extend at the other side of the lever shaft 11, are opposing walls defined by concentric arcuate surfaces. The guide walls 33a to 33d lie along the circumference of the same circle when viewed in the axial direction (Y-axis direction) of the pivot shaft 31. The second guide 34 is defined by parts of a spherical surface centering on a pivot fulcrum point P of the lever unit 3 (refer to FIGS. 4 and 5). In the present example, the second guide 34 includes guide walls 34a and 34b, which are opposing walls. The guide wall 34a connects the guide walls 33a and 33c of the first guide 33, and the guide wall 34b connects the guide walls 33b and 33d of the first guide 33. As illustrated in FIG. 5, the guide walls 34a and 34b are defined by arcuate surfaces in a cross-sectional view taken along the axial direction (Y-axis direction).

The lever unit 3 also includes an extension rod 35 that extends from two opposite sides of the lever shaft 11 in a direction intersecting the pivot shaft 31 (X-axis direction in FIGS. 2 and 3). In the present example, the extension rod 35 extends in a direction perpendicular to the pivot shaft 31 and is narrower than the pivot shaft 31.

Figure 4:
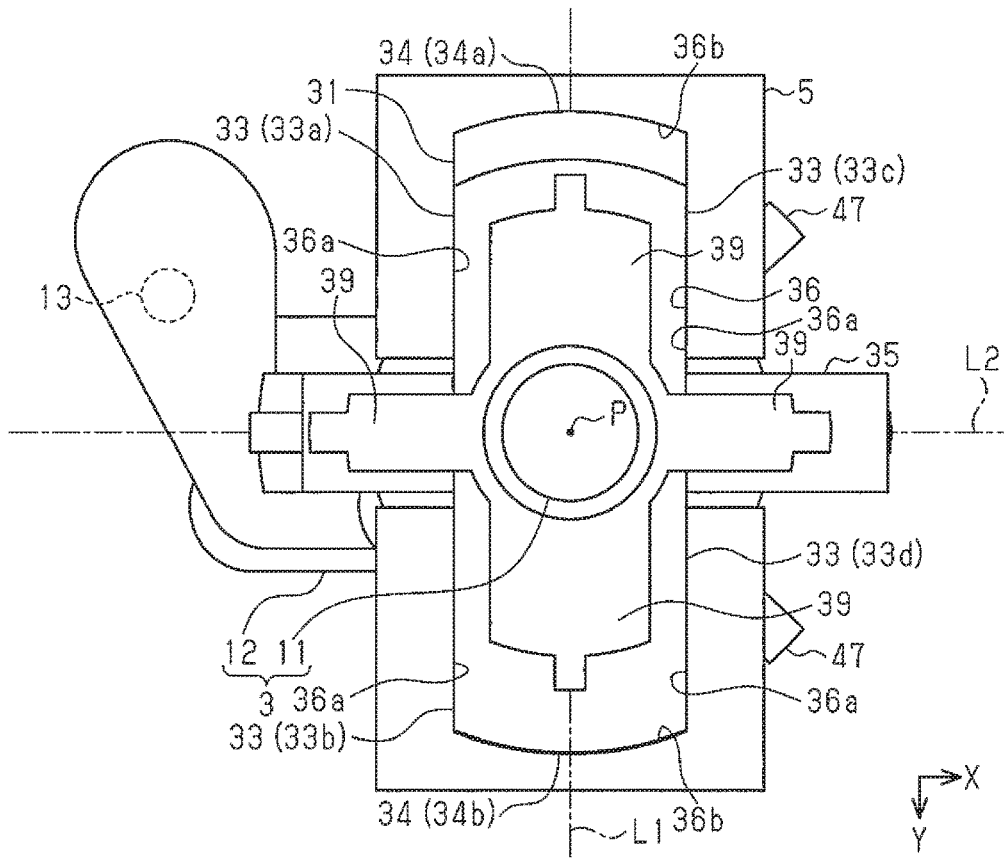
FIG. 4 is a plan view illustrating a first guide and a second guide of the lever unit.
Figure 5:
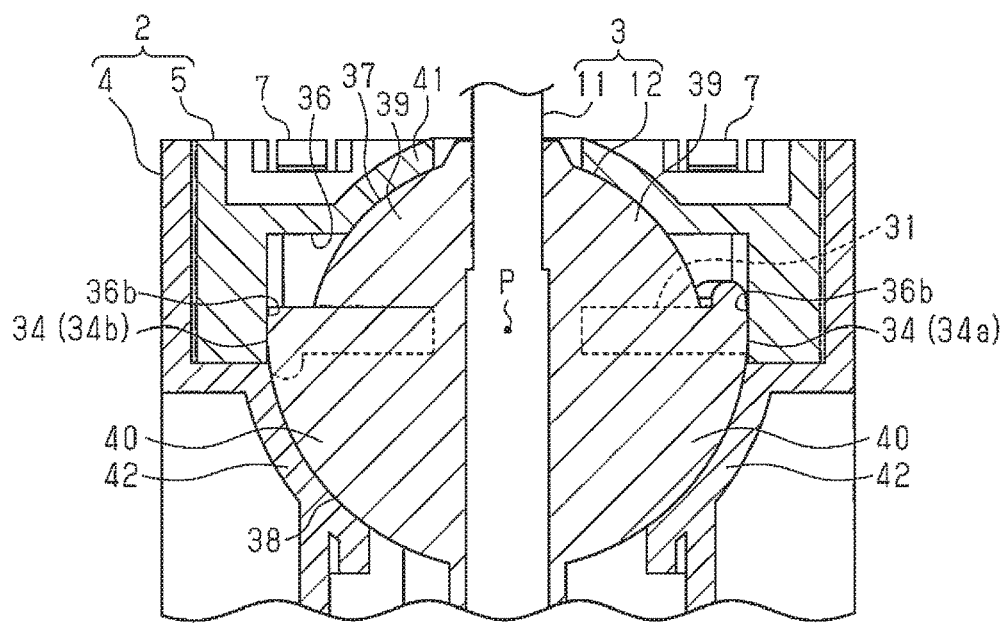
FIG. 5 is a cross-sectional view of an upper slide portion and a lower slide portion that support the lever unit in a slidable manner.

As illustrated in FIG. 4, the pivot shaft 31 contacts, in a slidable manner, the retainer 36 of the housing 2 (cover 5 in present example). The retainer 36 includes first contact surfaces 36a and second contact surfaces 36b in the present example. The first guide 33 slides along the first contact surfaces 36a, and the second guide 34 slides along the second contact surfaces 36b. The extension rod 35 is also accommodated in the retainer 36 of the cover 5. The extension rod 35 is spaced apart by a gap from the retainer 36.

As illustrated in FIG. 5, the lever device 1 includes an upper slide portion 37 and a lower slide portion 38 that allow the lever unit 3 to slide on the housing 2. In the present example, the upper slide portion 37, which is located between the lever unit 3 and the cover 5, supports the lever unit 3 above the pivot shaft 31 so that the lever unit 3 is slidable on the cover 5. Further, in the present example, the upper slide portion 37 supports the lever unit 3 on the cover 5 with a spherical surface (arcuate cross section). The upper slide portion 37 includes, for example, a plurality of ribs 39 and a support 41. Each rib 39 is formed on the lever unit 3 and has an arcuate cross section. The support 41 is formed on the cover 5 and has an arcuate cross section. The support 41 is, for example, formed in the cover 5 and generally dome-shaped.

The lower slide portion 38, which is located between the lever unit 3 and the housing main body 4, supports the lever unit 3 below the pivot shaft 31 so that the lever unit 3 is slidable on the housing main body 4. In the present example, the lower slide portion 38 supports the lever unit 3 on the housing main body 4 with a spherical surface (arcuate cross section). The lower slide portion 38 includes, for example, a plurality of (three in present example) ribs 40 and a plurality of (three in present example) supports 42. Each rib 40 is formed on the lever unit 3 and has an arcuate cross section. Each support 42 is formed on the housing main body 4 and has an arcuate cross section. The support 42 is, for example, a projection locally formed on an inner wall of the housing main body 4 (refer to FIG. 3). The ribs 40 of the lower slide portion 38 are larger in size than the ribs 39 of the upper slide portion 37.

Figure 6:
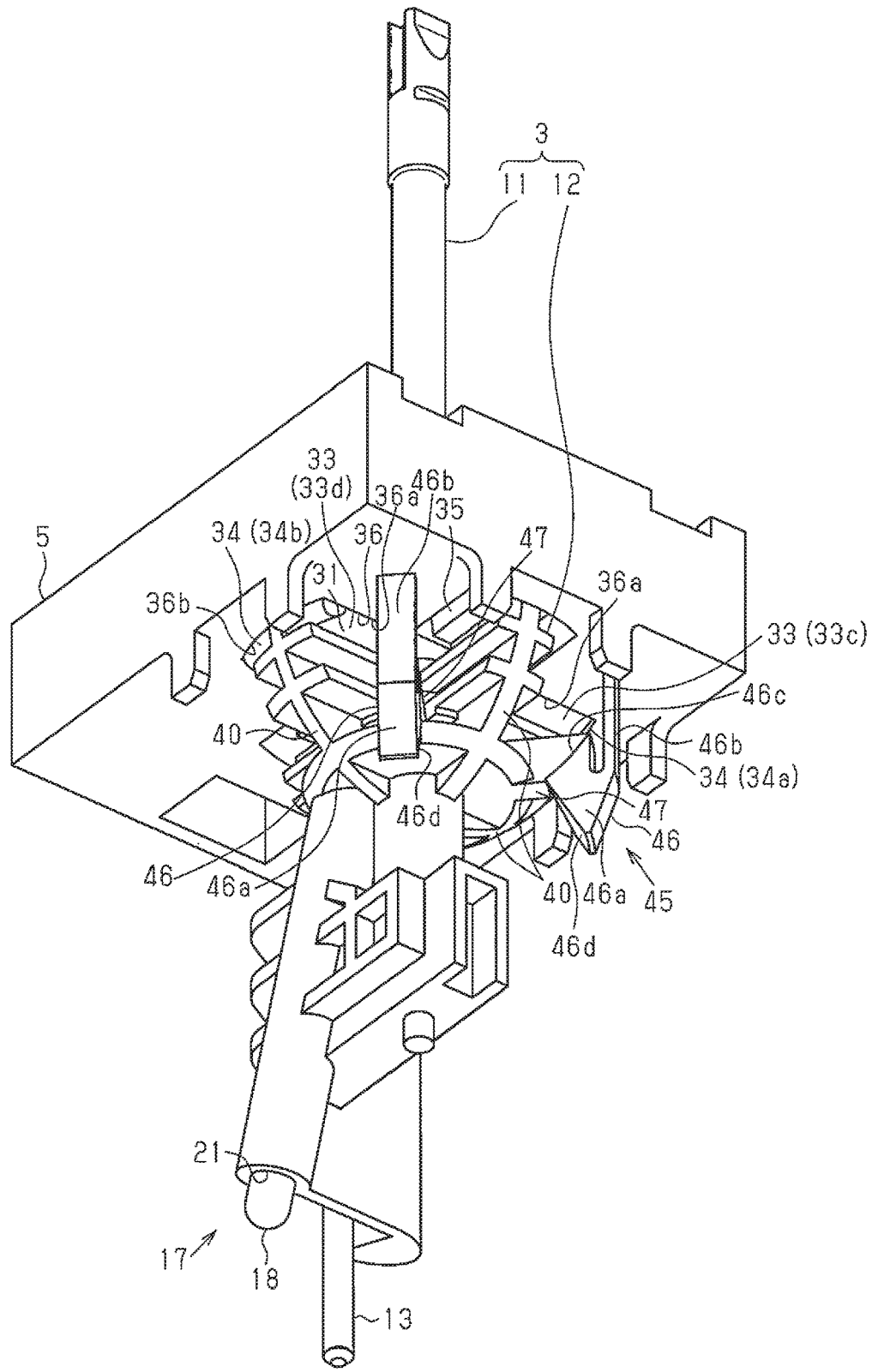
FIG. 6 is a perspective view of a backlash reduction mechanism.

As illustrated in FIG. 6, the lever device 1 further includes a backlash reduction mechanism 45 to reduce backlash of the lever unit 3 coupled to the housing 2. The backlash reduction mechanism 45 receives load from the lever unit 3 and uses the reaction generated by the load to urge and press the lever unit 3 against the retainer 36. This reduces backlash between the lever unit 3 and the retainer 36. In the present example, the backlash reduction mechanism 45 includes reaction generators 46 and mounts 47. Each reaction generator 46 is hook-shaped and generates the reaction of the load applied by the lever unit 3. Each mount 47 abuts against the corresponding reaction generator 46. In the present example, the reaction generators 46 are formed on the cover 5, and the mounts 47 are formed on the lever unit 3. The backlash reduction mechanism 45 includes multiple sets (two sets in present example) of the reaction generator 46 and the mount 47. The backlash reduction mechanism 45 supports the lever unit 3 from below with the reaction generators 46 while applying a predetermined urging force to the lever unit 3. This reduces backlash between the lever unit 3 and the housing 2.

Figure 7:
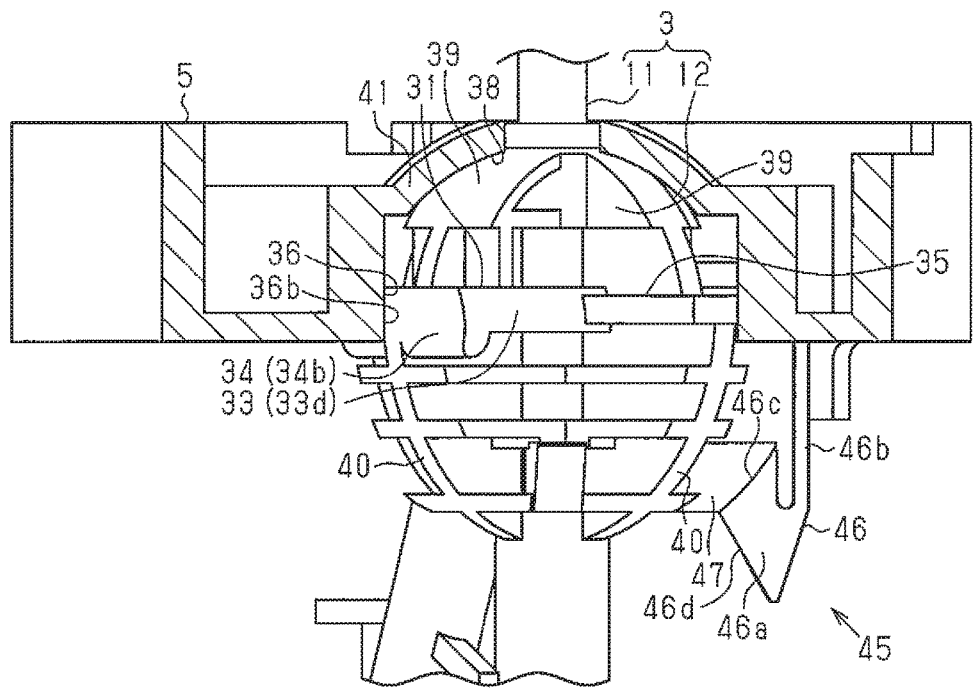
FIG. 7 is a partially cutaway side view of the backlash reduction mechanism illustrated in FIG. 6.

As illustrated in FIG. 7, each reaction generator 46 includes a support piece 46a, which contacts the lever unit 3, and a connecting post 46b, which connects the support piece 46a to the cover 5. The support piece 46a includes a sloped rest 46c, on which the corresponding mount 47 of the lever unit 3 rests, and a pawl 46d, which is tapered in a cross-sectional view. The connecting post 46b of the reaction generator 46 is deformable. In the present example, the lever unit 3 is coupled to the housing main body 4. Then, the cover 5 is coupled to the housing main body 4 from the vertically upper side. When coupling the cover 5 to the housing main body 4, the pawls 46d come into contact with the lever unit 3. This deforms the reaction generators 46 at the connecting posts 46b. When the mounts 47 of the lever unit 3 are placed on the rests 46c of the support pieces 46a, the reaction generators 46 support the lever unit 3.

Figure 8:
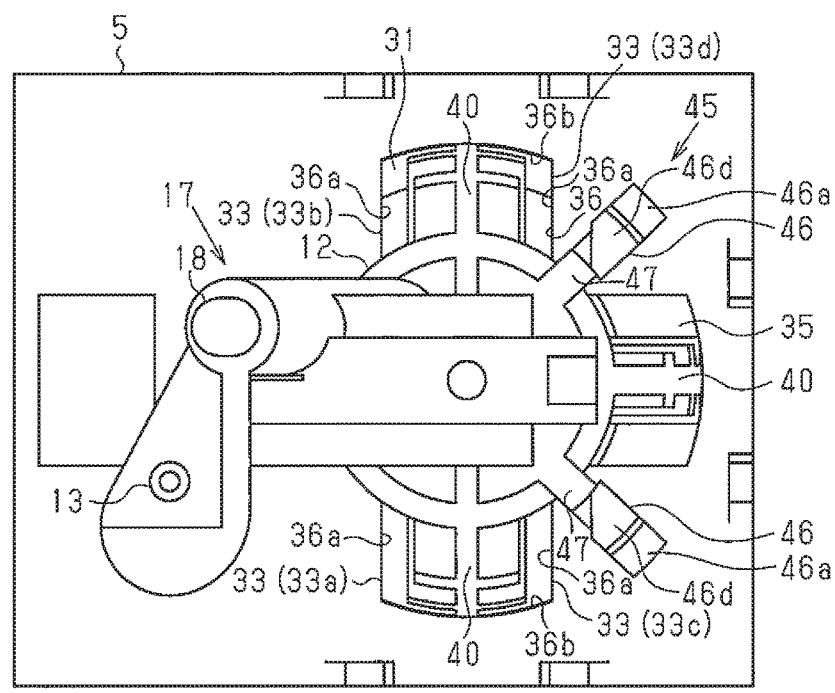
FIG. 8 is a bottom view of the backlash reduction mechanism illustrated in FIG. 6.

As illustrated in FIG. 8, the backlash reduction mechanism 45 and the clicking mechanism 17 are located at opposite sides of the lever shaft 11. Thus, one side of the lever unit 3 is supported by the backlash reduction mechanism 45, and the other side of the lever unit 3 is supported by the clicking mechanism 17. This allows the lever unit 3 to be supported in a well-balanced manner.

The operation of the lever device 1 will now be described with reference to FIGS. 9 to 11.

Figure 9:
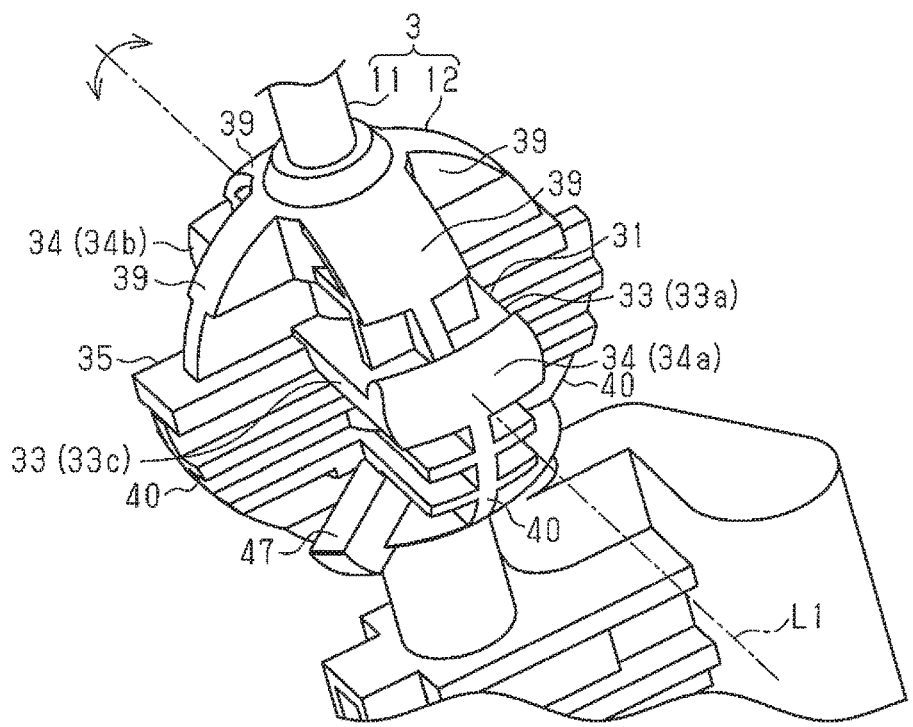
FIG. 9 is a perspective view illustrating the lever unit moved in the shift direction.

Referring to FIG. 9, when the lever unit 3 is operated in the first direction (shift direction), the lever unit 3 is pivoted about a first pivot axis L1 that extends in the axial direction of the pivot shaft 31. In this case, the first guide 33 slides along the first contact surfaces 36a and functions as a sliding guide that permits pivoting of the lever unit 3 in the first direction. When the lever unit 3 is pivoted in the first direction, the second guide 34 slides along the second contact surfaces 36b. Thus, the second guide 34 does not interfere with the operation of the lever unit 3 in the first direction.

Figure 10:
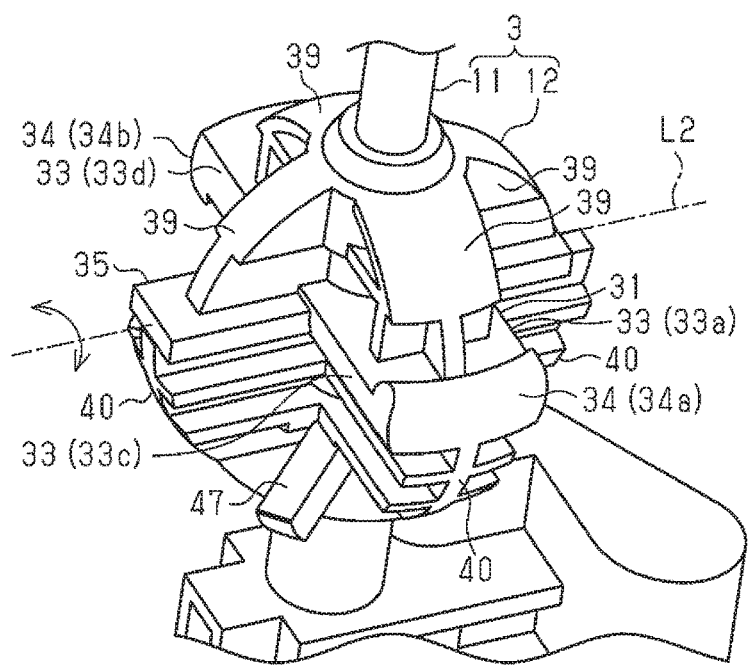
FIG. 10 is a perspective view illustrating the lever unit moved in the select direction.

Referring to FIG. 10, when the lever unit 3 is operated in the second direction (select direction), the lever unit 3 is pivoted about a second pivot axis L2 that extends in the axial direction of the extension rod 35. In this case, the second guide 34 slides along the second contact surfaces 36b and functions as a sliding guide that permits pivoting of the lever unit 3 in the second direction. When the lever unit 3 is pivoted in the second direction, the first guide 33 slides along the first contact surfaces 36a. Thus, the first guide 33 does not interfere with the operation of the lever unit 3 in the second direction.

Figure 11:
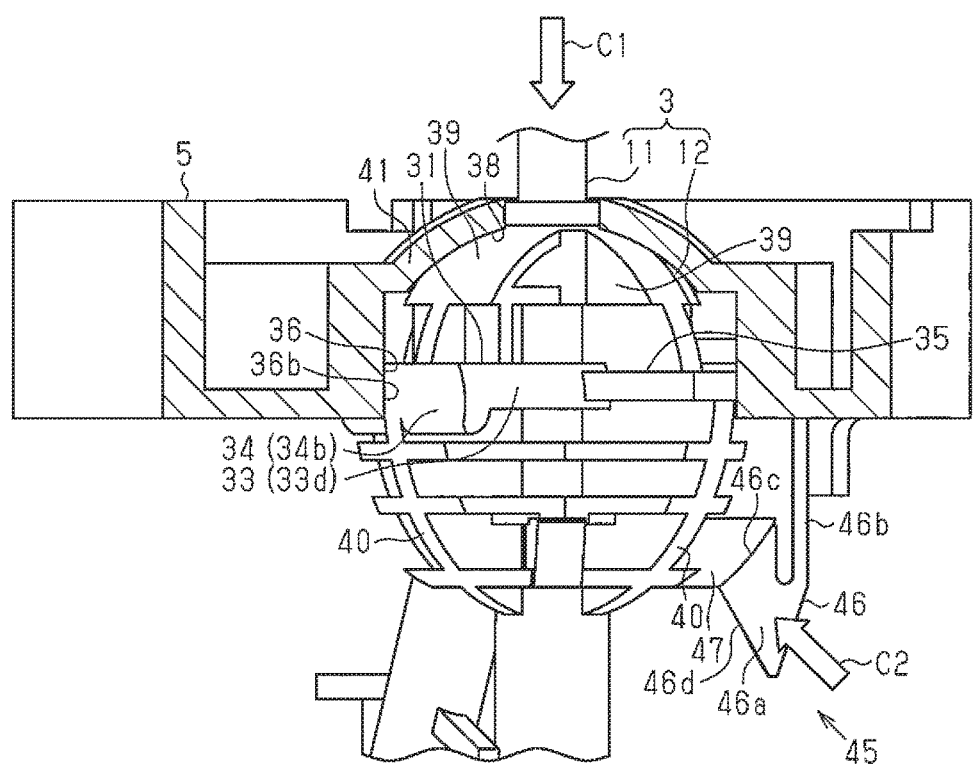
FIG. 11 is a partially cutaway side view of the backlash reduction mechanism when downward load is applied to the lever unit.

Referring to FIG. 11, when a user places his or her hand on the lever unit 3, load is applied to the lever unit 3 (lever shaft 11) in the downward direction (direction of arrow C1 in FIG. 11). In this case, the lever device 1 of the present example includes the backlash reduction mechanism 45, and the reaction generators 46 lift the lever unit 3 with a predetermined urging force from the diagonally lower side as indicated by arrow C2 in FIG. 11. Thus, even when the user places his or her hand on the lever unit 3 and applies load to the lever unit 3 in the downward direction, the reaction generators 46 support the lever unit 3 from below. Thus, the lever unit 3 does not sink. In other words, there is no backlash even if the user places his or her hand on the lever unit 3.

The structure of the present embodiment has the advantages described below.

(1) The lever unit 3 includes the pivot shaft 31 that extends from two opposite sides of the lever shaft 11 in a direction intersecting the lever shaft 11 and functions as a pivot axis of the lever unit 3 when the lever unit 3 is operated in the shift direction (first direction). The pivot shaft 31 includes the first guide 33, which permits movement of the lever unit 3 by sliding on the retainer 36 (inner wall surfaces of cover 5 in present example) when the lever unit 3 is operated in the shift direction (first direction), and the second guide 34, which permits movement of the lever unit 3 by sliding on the retainer 36 when the lever unit 3 is operated in the select direction (second direction). Thus, the single pivot shaft 31 enables the lever unit 3 to be pivotal about two axes in the shift direction and the select direction. There is no need for the lever unit 3 to be supported on the housing 2 by two pin-like pivot shafts to be pivotal about two axes. This reduces the number of components in the lever device 1.

(2) The housing 2 includes the housing main body 4 and the cover 5. The lever unit 3 is coupled between the housing main body 4 and the cover 5. In this structure, for example, after coupling the lever unit 3 to the housing main body 4, the cover 5 is coupled to the housing main body 4 from the vertically upper side to assemble the lever device 1. This facilitates the assembling of the lever device 1.

(3) The cover 5 of the housing 2 includes the retainer 36. This allows the first guide 33 and the second guide 34 to slide on the cover 5 of the housing 2. In this structure, the retainer 36 of the cover 5 reduces backlash when the lever unit 3 is operated. Further, the cover 5 restrains the lever unit 3 and firmly couples the lever unit 3 to the housing 2.

(4) The first guide 33 is defined by curved surfaces. The second guide 34 is defined by parts of a spherical surface centering on the pivot fulcrum point P of the lever unit 3. Thus, the curved first guide 33 and the spherical second guide 34 enable the lever unit 3 to be smoothly moved.

(5) The first guide 33 and the second guide 34 are defined by wall surfaces and thus have simple shapes.

(6) The lever device 1 includes the upper slide portion 37, which supports the lever unit 3 above the pivot shaft 31 so that the lever unit 3 is slidable on the housing 2, and the lower slide portion 38, which supports the lever unit 3 below the pivot shaft 31 so that the lever unit 3 is slidable on the housing 2. Thus, the lever unit 3 is supported and pressed against the housing 2 from above and below. This further effectively reduces backlash of the lever unit 3.

(7) The lever device 1 includes the backlash reduction mechanism 45 that reduces backlash between the lever unit 3 and the retainer 36. This improves the operation feel of the lever unit 3.

(8) The backlash reduction mechanism 45 and the clicking mechanism 17 are located at opposite sides of the lever unit 3 in a plane of the lever device 1 (X-Y plane in FIG. 1).

Thus, the clicking mechanism 17 and the backlash reduction mechanism 45 support the lever unit 3 in a well-balanced manner.

It should be apparent to those skilled in the art that the foregoing embodiments may be employed in many other specific forms without departing from the scope of this enclosure. Particularly, it should be understood that the foregoing embodiments may be employed in the following forms.

The first contact surfaces 36a and the second contact surfaces 36b may be defined by, for example, curved surfaces to enable smooth operation of the lever unit 3.

The retainer 36 does not have to be formed in the cover 5 and may be formed in other components such as the housing main body 4.

The shift pattern of the lever unit 3 (shape of guide groove 14) does not need to have the shape of a lower-case "h" and may be changed to any of a variety of patterns.

The first guide 33 and the second guide 34 do not have to be defined by curved surfaces and may be defined by other surfaces that allow the operation of the lever unit 3.

The two axes of the lever unit 3 do not have to extend in directions that are perpendicular to each other as long as they extend in intersecting directions.

The lever unit 3 may be moved in directions extending along three or more axes instead of two.

The extension rod 35 may be omitted.

The backlash reduction mechanism 45 does not have to include multiple sets of the reaction generator 46 and the mount 47 and may include, for example, a single set of the reaction generator 46 and the mount 47.

Each reaction generator 46 of the backlash reduction mechanism 45 does not have to be hook-shaped. The reaction generator 46 may be modified to another structure as long as it receives the load acting on the lever unit 3 and presses the lever unit 3 against the walls of the retainer 36 (housing 2) with the reaction generated by the load.

The upper slide portion 37 is not limited to the structure of the above embodiment and may be modified to another structure as long as it can position, in a slidable manner, the lever unit 3 that acts to move in the upper direction. Also, the lower slide portion 38 may be modified to another structure as long as it can position, in a slidable manner, the lever unit 3 that acts to move in the lower direction.

There may be more than one clicking mechanism 17. Further, in the above embodiment, the lever unit 3 includes the clicking piece 18, and the housing 2 includes the clicking elevation 20. Instead, the lever unit 3 may include the clicking elevation 20, and the housing 2 may include the clicking piece 18.

The position detection system and the clicking mechanism 17 do not have to be located at the basal side of the lever unit 3 (lower side of pivot shaft 31) and may be located, for example, at the distal side of the lever unit 3 (e.g., between knob 10 and pivot shaft 31).

The present examples and embodiments are to be considered as illustrative and not restrictive, and the invention is not to be limited to the details given herein, but may be modified within the scope and equivalence of the appended claims.

What is claimed is:

1. A lever device comprising:
   a housing; and
   a lever unit pivotally coupled to the housing so that the lever unit is pivotal in a plurality of different directions, wherein
   the lever unit includes:
   a lever shaft; and
   a pivot shaft that extends from two opposite sides of the lever shaft in a direction intersecting the lever shaft, wherein the pivot shaft functions as a pivot axis of the lever unit when the lever unit is pivoted in a first direction,
   the housing includes a retainer that accommodates the pivot shaft, and the pivot shaft includes:
   a first guide that is defined by opposing wall surfaces of the pivot shaft extending at the two opposite sides of the lever shaft and slides on the retainer when the lever unit is pivoted in the first direction to permit movement of the lever unit; and
   a second guide that is defined by opposing wall surfaces of the pivot shaft that connect the opposing wall surfaces of the first guide and slides on the retainer when the lever unit is operated in a second direction to permit movement of the lever unit.

2. The lever device according to claim 1, wherein the housing includes:
   a housing main body; and
   a cover coupled in a removable manner to the housing main body in a vertical direction, wherein
   the lever unit is coupled between the housing main body and the cover.

3. The lever device according to claim 2, wherein the cover includes the retainer.

4. The lever device according to claim 1, wherein
   each of the opposing wall surfaces of the first guide is defined by a curved surface, and
   each of the opposing wall surfaces of the second guide is defined by part of a spherical surface centering on a pivot fulcrum point of the lever unit.

5. The lever device according to claim 1, further comprising:
   an upper slide portion located between the lever unit and the housing, wherein the upper slide portion supports the lever unit above the pivot shaft so that the lever unit is slidable on the housing; and
   a lower slide portion located between the lever unit and the housing, wherein the lower slide portion supports the lever unit below the pivot shaft so that the lever unit is slidable on the housing.

6. The lever device according to claim 1, further comprising:
   a backlash reduction mechanism that receives load from the lever unit and urges the lever unit with reaction generated by the load to force the lever unit against a wall of the retainer and reduce backlash between the lever unit and the retainer.

7. The lever device according to claim 6, further comprising:
   a clicking mechanism,
   the clicking mechanism including:
   a click piece arranged on one of the lever unit and the housing;
   a click elevation arranged on the other one of the lever unit and the housing; and
   an urging member that forces the click piece against the click elevation, wherein
   the clicking mechanism causes the lever unit to click when pivoting of the lever unit moves the click piece over the click elevation, and
   the backlash reduction mechanism and the clicking mechanism are located at opposite sides of the lever unit.

* * * * *